US011463661B2

(12) United States Patent
Groce et al.

(10) Patent No.: US 11,463,661 B2
(45) Date of Patent: Oct. 4, 2022

(54) MODULAR NIGHT VISION SYSTEM FOR VEHICLES

(71) Applicants: Shawn Groce, Brooklyn, NY (US); Zevi Kramer, Brooklyn, NY (US); Jacky Yuan, New York, NY (US); Samantha Coughlan, Brooklyn, NY (US)

(72) Inventors: Shawn Groce, Brooklyn, NY (US); Zevi Kramer, Brooklyn, NY (US); Jacky Yuan, New York, NY (US); Samantha Coughlan, Brooklyn, NY (US)

(73) Assignee: NightRide Thermal LLC, Brooklyn, NY (US)

( * ) Notice: Subject to any disclaimer, the term of this patent is extended or adjusted under 35 U.S.C. 154(b) by 0 days.

(21) Appl. No.: 16/902,448

(22) Filed: Jun. 16, 2020

(65) Prior Publication Data
US 2020/0314388 A1 Oct. 1, 2020

Related U.S. Application Data

(60) Provisional application No. 62/862,734, filed on Jun. 18, 2019.

(51) Int. Cl.
| *H04N 7/18* | (2006.01) |
| *H04N 5/225* | (2006.01) |
| *B60R 1/00* | (2022.01) |
| *G06V 10/147* | (2022.01) |
| *G06V 20/58* | (2022.01) |

(52) U.S. Cl.
CPC ........... *H04N 7/183* (2013.01); *B60R 1/00* (2013.01); *G06V 10/147* (2022.01); *G06V 20/58* (2022.01); *H04N 5/2253* (2013.01)

(58) Field of Classification Search
CPC .... H04N 7/183; H04N 5/2253; H04N 5/2257; G06K 9/00805; G06K 9/209; B60R 1/00; B60R 2011/004; B60R 2300/106; B60R 11/04; G06V 10/147; G06V 20/58; G06V 20/56
See application file for complete search history.

(56) References Cited

U.S. PATENT DOCUMENTS

| 5,729,016 A * | 3/1998 | Klapper ............... B60R 1/00 250/332 |
| 2002/0021500 A1* | 2/2002 | Furuya ............... B60K 35/00 359/630 |

(Continued)

*Primary Examiner* — Michael E Teitelbaum
(74) *Attorney, Agent, or Firm* — Douglas J. Ryder; Ryder, Mazzeo & Konieczny LLC

(57) ABSTRACT

Present invention discloses a night vision system for a vehicle and method of installation for the night vision system on the vehicle. The night vision system includes a mount, a night vision device detachably mountable on the vehicle using the mount. The night vision device is mounted pointing over a road for detecting one or more objects present on and alongside the road. The system further includes a display device configurable within an interior region of the vehicle for displaying a video stream received from the night vision device to a user driving the vehicle. The display device is configured to embody a program product for enabling the display device to receive, process and display the received video stream on the display device.

19 Claims, 13 Drawing Sheets

(56) References Cited

U.S. PATENT DOCUMENTS

| | | | |
|---|---|---|---|
| 2006/0017656 A1* | 1/2006 | Miyahara | B60R 1/00 345/8 |
| 2013/0038733 A1* | 2/2013 | Palmer | H04N 5/33 348/148 |
| 2015/0172567 A1* | 6/2015 | Ekeroth | H04N 5/2258 348/82 |

* cited by examiner

MODULAR NIGHT VISION SYSTEM FOR VEHICLES

CROSS-REFERENCE TO RELATED PATENT DOCUMENTS

This patent application claims the benefit of priority of U.S. Provisional Application No. 62/862,734 entitled "A MODULAR NIGHT VISION SYSTEM FOR VEHICLES," filed Jun. 18, 2019, which is hereby incorporated herein by reference in its entirety.

TECHNICAL FIELD

The present invention relates generally to night vision systems for vehicles, and more particularly, to a modular night vision system having a night vision device, and associated components for interchangeably mounting, and configuring the night vision device on various vehicles for allowing respective users/drivers of the vehicles to see objects at relatively low visibility conditions.

BACKGROUND

According to the National Safety Council of the United States, the risk of a fatal crash is three times greater at night. Depth perception, color recognition and peripheral vision can be compromised in the dark, and the glare of headlights from an oncoming vehicle can temporarily blind a driver. As we age, we have greater difficulty seeing at night and that could be one factor leading to increase in the fatality rate. Further, driving while the driver is tired or blinded by glare are other factors leading to the increase in the fatality rate. In all these situations, the drivers compromise their vision during night driving.

Typically, night vision systems or cameras are considered as a reliable solution that could lower risks involved during night driving. The night vision systems are used by vehicle owners/drivers at night to see objects at relatively low light conditions. The known night vision systems either utilize near infrared light source or a near-infrared (NIR) diode laser or a filtered incandescent light source. In operation, the light from these light sources are reflected off objects in the environment and is received by the camera or vision system which then displays the detected objected to the vehicle owners/drivers responsible for driving the vehicle.

Currently, the available night vision systems or cameras are costly and are typically offered only as optional equipment on certain premium vehicles. These premium vehicles are unaffordable for lot of users. Further, in lot of vehicles where these night vision systems are made available, the night vision systems are rigidly fixed and thus do not allow the users to interchangeably use the night vision system on different vehicles.

Thus, what is needed is a modular night vision system that can be interchangeably mounted, and configured on different vehicles in no time and allow the respective users/drivers of the vehicles to see objects at relatively low visibility conditions.

SUMMARY

It is an objective of the present invention to provide a modular night vision system that can be interchangeably mounted or configured on different vehicles and once configured allows respective users/drivers of the vehicles to see objects at relatively low visibility conditions. This would increasingly lower the cost burden on vehicle owners, as the vehicle owners have to purchase just one night vision system and they can interchangeably mount the system on different vehicles.

It is an objective of the present invention to provide a modular night vision system that is easy to mount and un-mount and configure for use with any vehicles, including both personal and commercial use vehicles.

According to an aspect of the present invention, there is provided a night vision system for a vehicle. The night vision system includes a mount, a night vision device detachably mountable on the vehicle using the mount, wherein the night vision device is mounted pointing over a road for detecting one or more objects present on and alongside the road, a display device configurable within an interior region of the vehicle for displaying a video stream received from the night vision device, wherein the display device is configured to embody a program product for enabling the display device to receive, process and display the received video stream on the display device.

According to the same aspect, the night vision device comprises at least an IR detector for detecting thermal radiation from the one or more objects; a processor in communication with the IR detector for receiving the detected radiation, processing, generating the video stream corresponding to the detected radiation from the one or more objects, and displaying the video stream on the display device configured within the interior region of the vehicle in the vicinity of a user driving the vehicle; a power supply and logic board in communication with the processor for controlling and managing the operations of the processor; and a communication module linked to the processor for relaying the video stream generated to the display device.

According to the same aspect, the night vision device is mountable on at least a hood, a fender, a roof, a bar light, and a spotlight of the vehicle.

According to the same aspect, the display device configurable within the interior region of the vehicle is configured on at least a windshield, and a dashboard of the vehicle. The configuration of the display device on the windshield requires a suction mount, and the configuration of the display device on the dashboard require use of a reflective display configurable on the windshield such that the video stream displayed on the display device is mirrored or casted on the reflective display.

According to the same aspect, the night vision system further comprising an electrical cable connecting the night vision device to a source of power present in the vehicle. The source of power comprising at least vehicle's internal combustion engine, or battery.

According to another aspect of the present invention, there is provided a method of installation of a night vision system on a vehicle, the night vision system comprising a mount, a night vision device, and a display device, the method of installation comprising steps of: securing the mount on the vehicle; mounting and positioning of the night vision device over the mount, wherein the night vision device is positioned such that the night vision device points over a road for detecting one or more objects present on and alongside the road; electrically connecting the night vision device to a source of power of the vehicle; and displaying a video stream received from the night vision device by the display device configurable within an interior region of the vehicle, wherein the display device is configured to embody a program product for enabling the display device to receive, process and display the received video stream on the display device.

According to yet another aspect of the present invention there is provided a night vision system for a vehicle. The night vision system includes a night vision device detachably mountable on a vehicle's windshield pointing over a road for detecting one or more objects present on and alongside the road; a pair of pads configured on the vehicle's windshield, wherein a first pad of the pair of pads acting as a transmitter and mounted on an inner side of the vehicle's windshield and a second pad of the pair of pads acting as a receiver and mounted outside the vehicle's windshield just opposite to the first pad; and a display device configured on at least a windshield or a dashboard within interior of the vehicle for displaying a video stream received from the night vision device, wherein the display device is configured to embody a program product for enabling the display device to receive, process and display the received video stream on the display device.

These and other features and advantages of the present invention will become apparent from the detailed description below, in light of the accompanying drawings.

BRIEF DESCRIPTION OF THE DRAWINGS

For a more complete understanding of the invention, there will now be described some embodiments thereof, given by way of example, reference being made to the accompanying drawings, in which.

DETAILED DESCRIPTION

Figure 1:
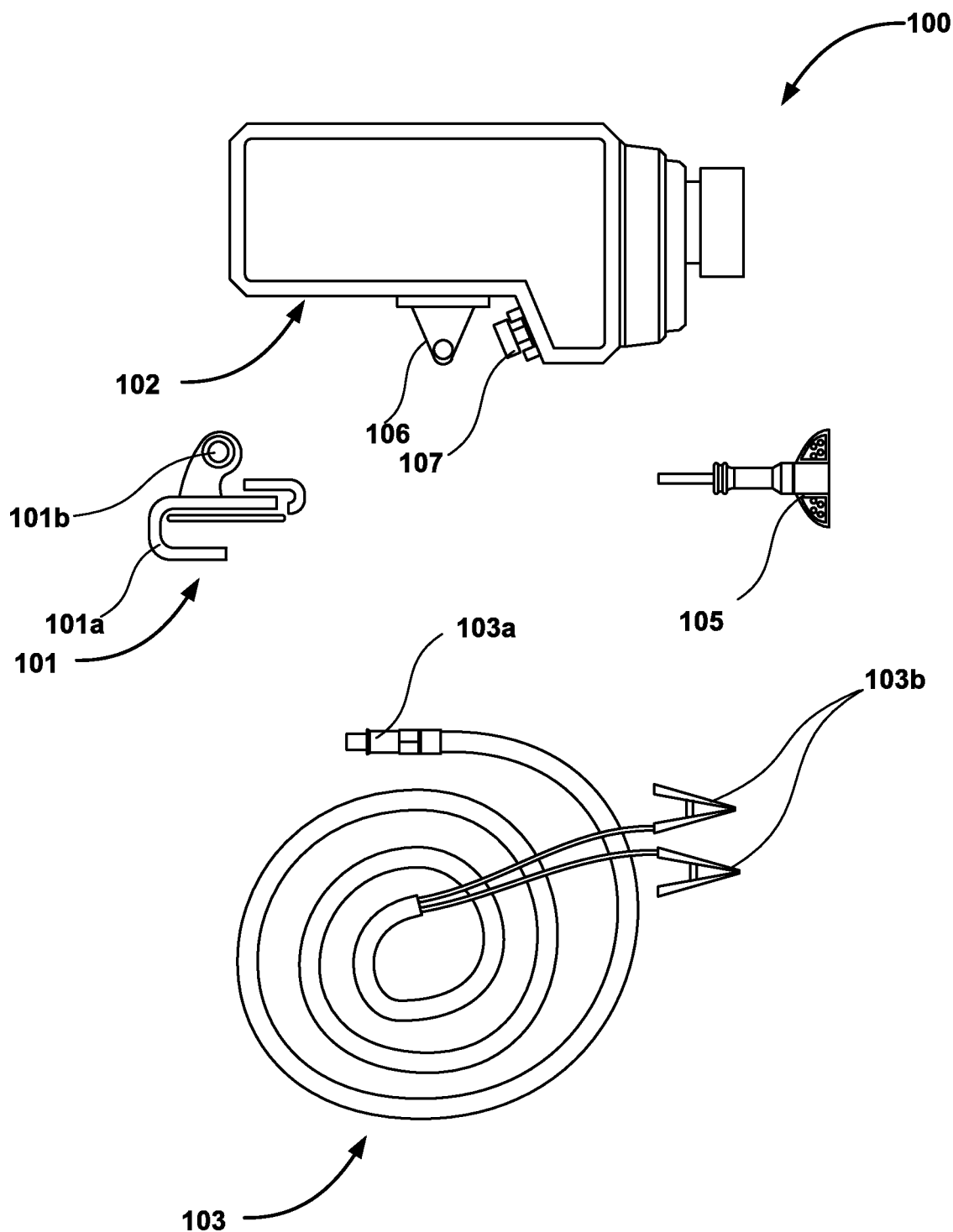
FIG. 1 illustrates a modular night vision system having a night vision device, and associated components for interchangeably mounting, and configuring the night vision device on various vehicles, in accordance with one exemplary embodiment of the present invention.
Figure 2:
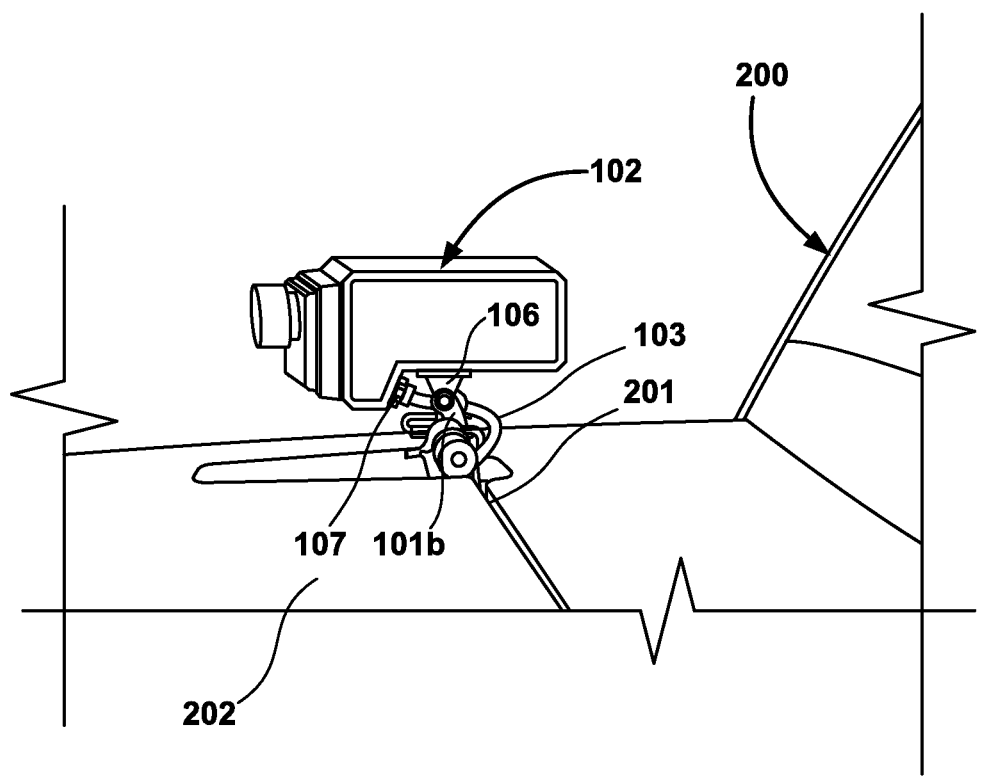
FIGS. 2-3 show the night vision device of FIG. 1 mounted on a vehicle's hood pointing straight ahead onto a road and a cable connected to an input port of the night vision device.
Figure 3:
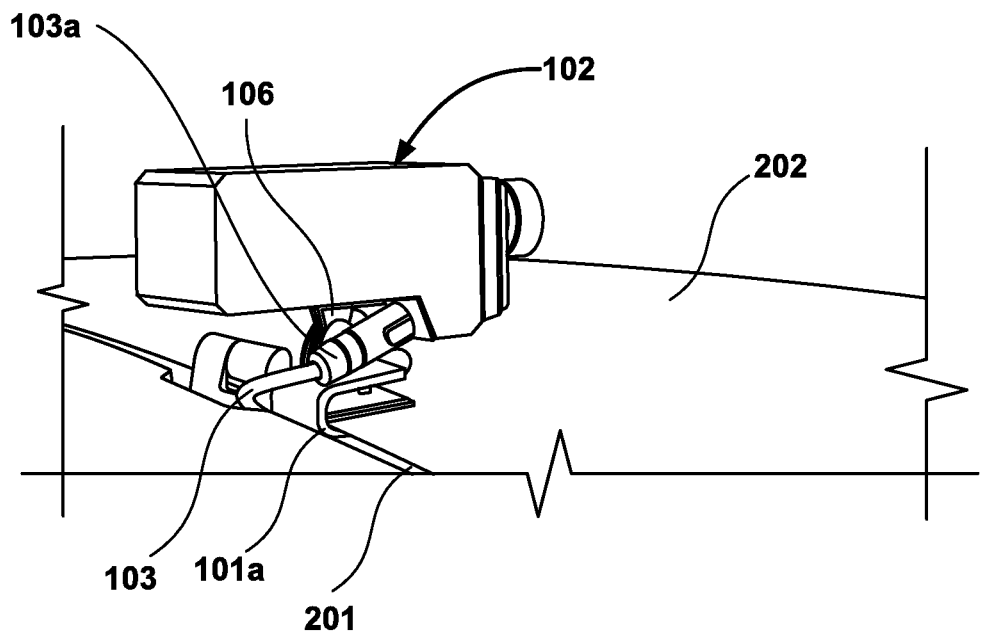

As used in the specification, the singular forms "a", "an" and "the" may also include plural references. For example, the term "an article" may include a plurality of articles. Those with ordinary skill in the art will appreciate that the elements in the figures are illustrated for simplicity and clarity and are not necessarily drawn to scale. There may be additional components or processes described in the foregoing application that are not depicted on the described drawings. In the event such a component or process is described, but not depicted in a drawing, the absence of such component and process from the drawings should not be considered as an omission of such design from the specification.

Before describing the present invention in detail, it should be observed that the present invention utilizes a combination of components or processes, which constitutes a night vision system and method of installation of the night vision system. Accordingly, the components or processes have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific component level details and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "an embodiment", "another embodiment", "an example", "another example", "an aspect", "and another aspect" and so on, indicate that the embodiment(s) or example(s) or aspect (s) so described may include a particular feature, structure, characteristic, property, element, or limitation, but that not every embodiment or example necessarily includes that particular feature, structure, characteristic, property, element or limitation. Furthermore, the words "comprising", "having", "containing", and "including", and other forms thereof, are intended to be equivalent in meaning and be open ended in that an item or items following any one of these words is not meant to be an exhaustive listing of such item or items or meant to be limited to only the listed item or items.

The modular night vision system for vehicles, possible alternative embodiments, and methods of their installation will now be described with reference to the accompanying drawings, particularly FIGS. 1-13.

Referring to accompanying figures, particularly FIGS. 1-8, the night vision system 100 and method of its installation according to an embodiment of the present invention is shown. The night vision system 100 includes a mount 101, a night vision device 102, a cable 103, a display device 104, and a key with screw driver 105.

According to the embodiment, the mount 101 of the night vision system 100 includes a shoe portion 101a that clips or hooks onto lip 201 of a vehicle's hood 202 where the mount 101 is placed. The mount 101 further includes a guide portion 101b configured to connect to a complementing guide portion 106 of the night vision device 102. The mount 101 further includes a provision to drive in a screw (not seen) therein using the key with screwdriver 105 in order to lock the mount 101 in place and to ensure that the night vision device 102 doesn't get removed easily when the night vision device 102 is securely mounted over the mount 101. According to the embodiment, the mount 101 may be made of metal such as aluminium. However, it should be understood that the mount 101 may also be made of an array of materials.

The night vision device 102 of the night vision system 100 is detachably mountable on the vehicle's hood 202 (over the mount 101) pointing straight ahead over a road so that objects on the road and alongside of the road are detected by the device 102.

Figure 5:
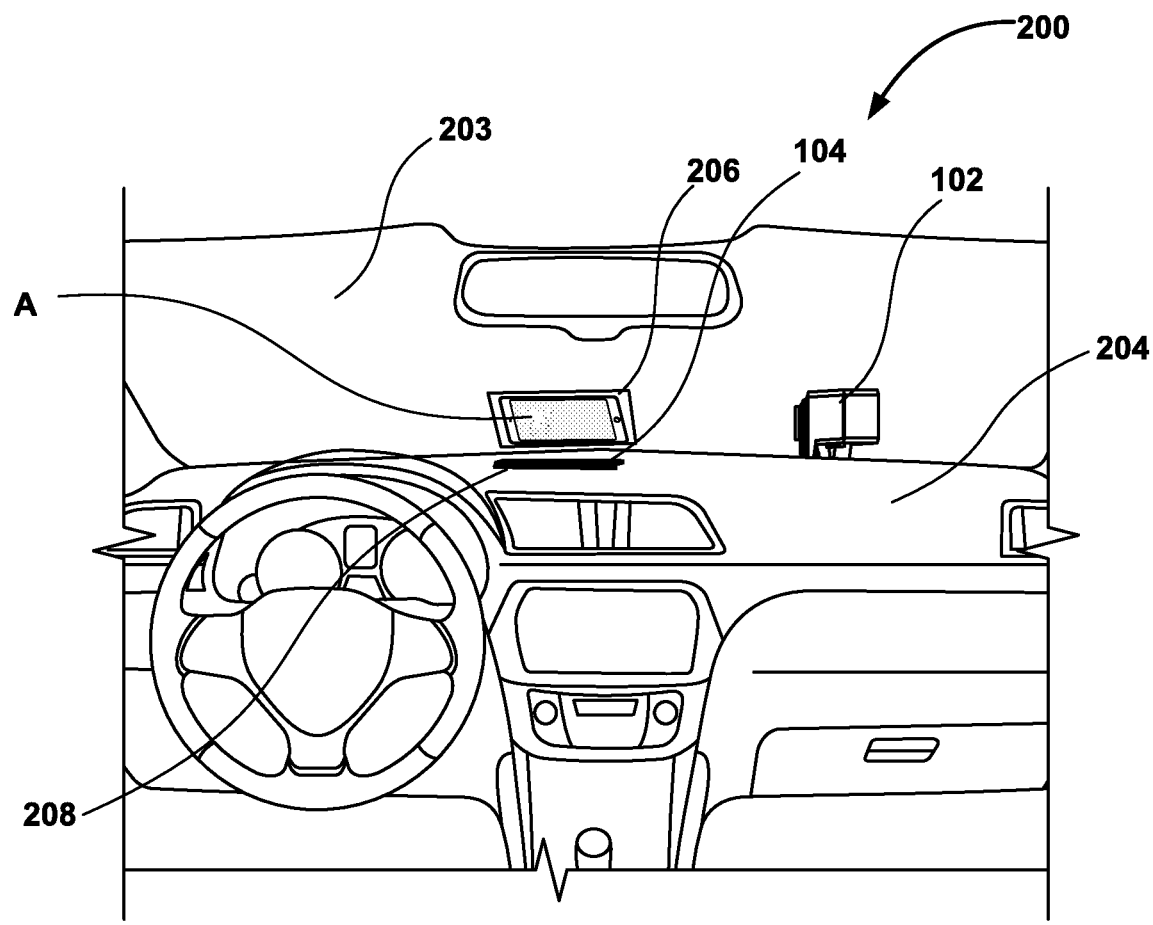
FIG. 5 shows an internal environment or a dashboard within the vehicle, specifically a reflective display configured on a windshield of the vehicle to display objects detected by the night vision device of FIG. 1 installed on the vehicle's hood.
Figure 6:
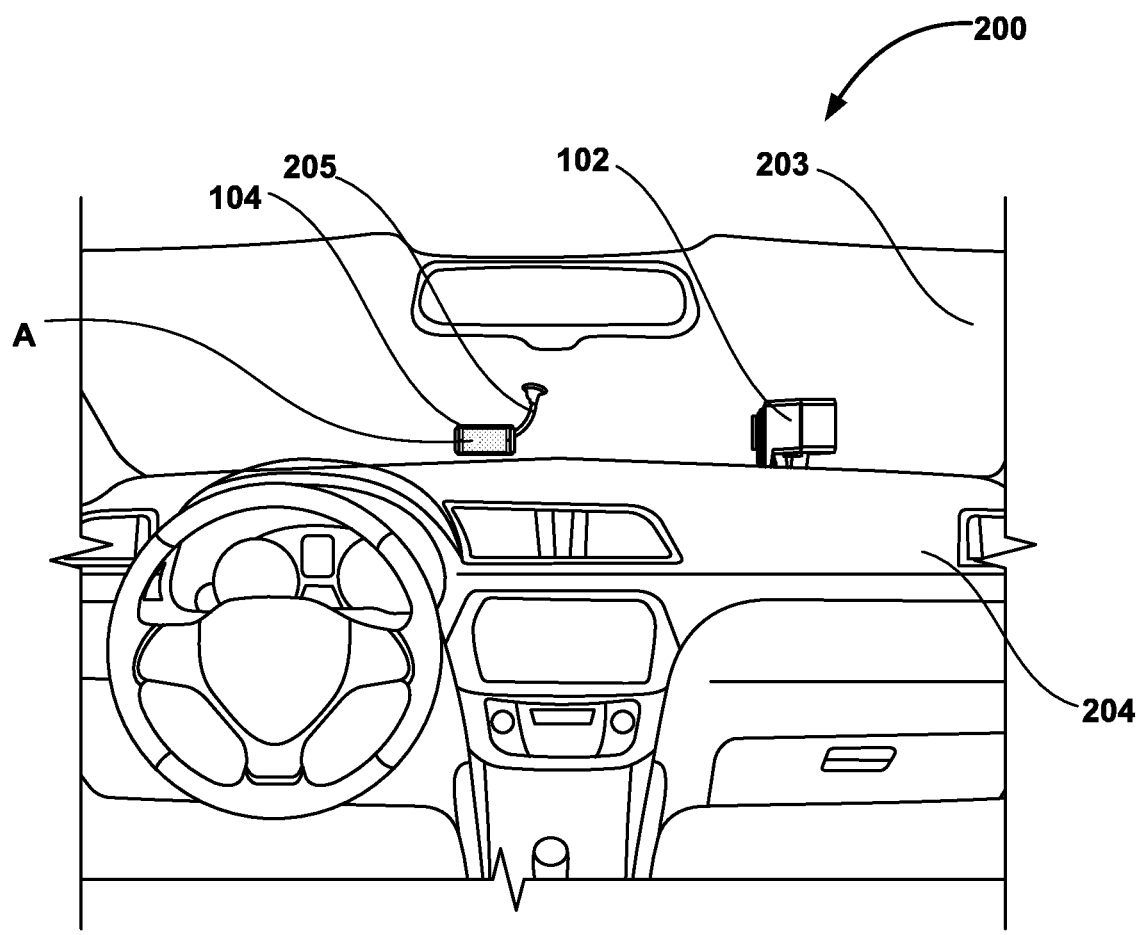
FIG. 6 shows an internal environment or a dashboard within the vehicle, specifically an alternative form of display that displays the objects detected by the night vision device of FIG. 1 installed on the vehicle's hood.
Figure 7:
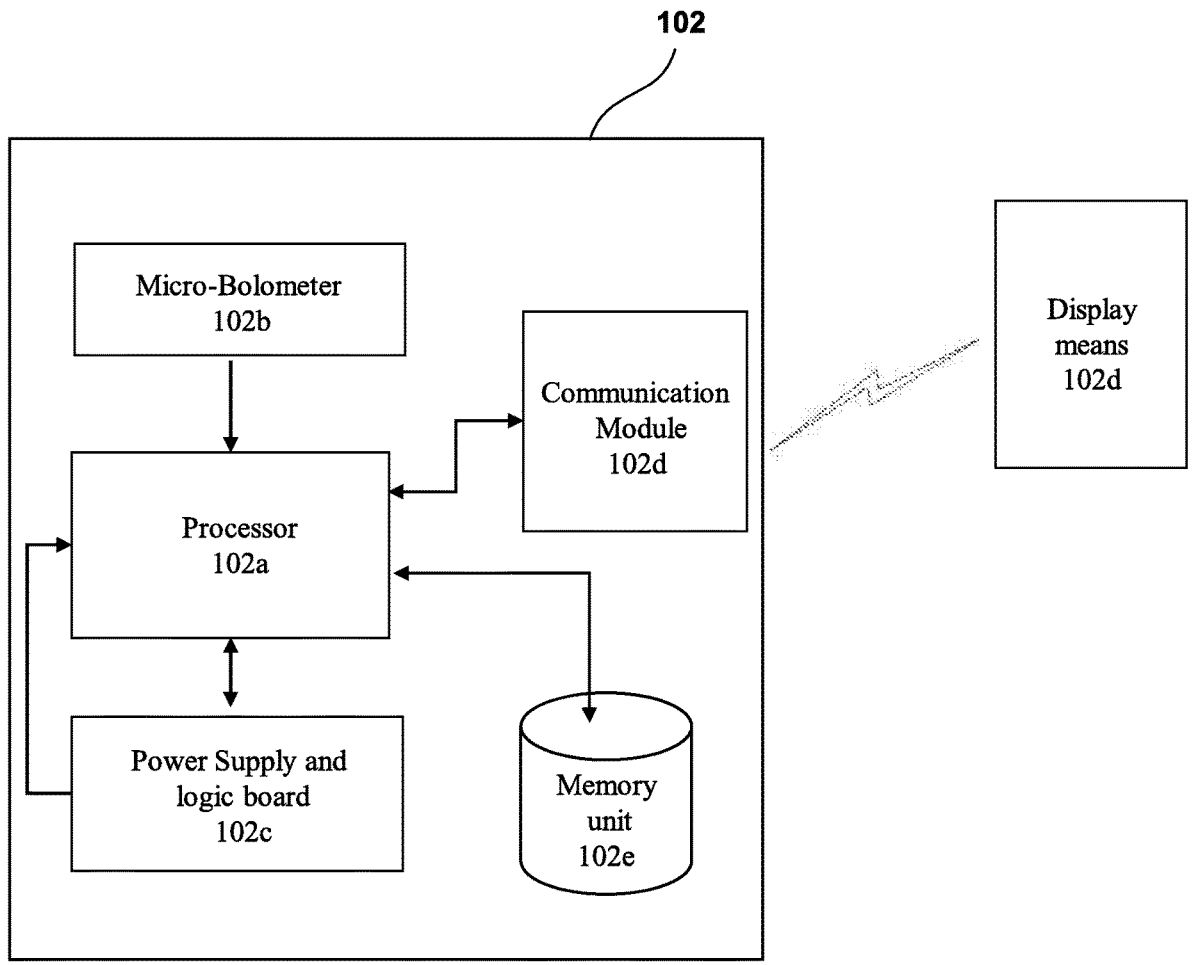
FIG. 7 shows a schematic block diagram representation for the night vision device that detects and facilitates display of objects during night driving, according to an embodiment of the present invention.

Further, according to the embodiment, as shown in FIG. 7, the night vision device 102 includes a processor 102a, an IR detector 102b communicatively linked to the processor 102a and that detect thermal radiation from objects. In an example, the IR detector is Micro-Bolometer 102b. The processor 102a receives the detected radiation information from the detector 102b, processes the same based on certain logics to generate a video stream corresponding to the detected radiation from the objects. This generated video is then transmitted to the display device 104 for view by the user driving the vehicle 200. According to the embodiment, the display device 104 includes but not limited to mobile phones, tablets, computers, laptops or the like communication devices held by the user driving the vehicle 200. The display device 104 may be mounted on a windshield 203 (as shown in FIG. 6) or on a dashboard 204 (as shown in FIG. 5) or other regions within interior of the vehicle 200 in the vicinity of the user driving the vehicle 200. In an example, the display device 104 may be mounted on the windshield 203 of the vehicle 200 using a suction mount 205 or similar mounting device as shown in FIG. 6. In another example, the display device 104 may be placed on the dashboard 204 of the vehicle 200, and the screen/display of the display device 104 can be mirrored on the windshield 203 of the vehicle 200 using a reflective display 206 mounted on the windshield 203 (as shown in FIG. 5), which will be described in greater detail in the description to follow. The display device 104 is provided with a program product and various other components configured thereon to process the same and help in receiving, processing and displaying the videos stream from the processor 102a (or the night vision device 102) as described and shown with respect to FIG. 8.

Furthermore, the night vision device 102 includes a power supply and logic board 102c in communication with the processor 102a for controlling and managing the operations of the processor 102a. It should be understood that the term "logic board" here is used in a broader sense to include at least one microcontroller, memory with logics stored in the memory that define operation of the processor 102. The logic device a set of program instructions that define functionality of the processor 102a. The night vision device 102 further includes a communication module 102d linked to the processor 102a for relaying the video stream from the processor 102a (or so to say the night vision device 102) to the display device 104.

The night vision device 102 further includes a memory unit 102e. The generated video streams by the processor 102 are storable in the memory unit 102e for later retrieval.

Figure 4:
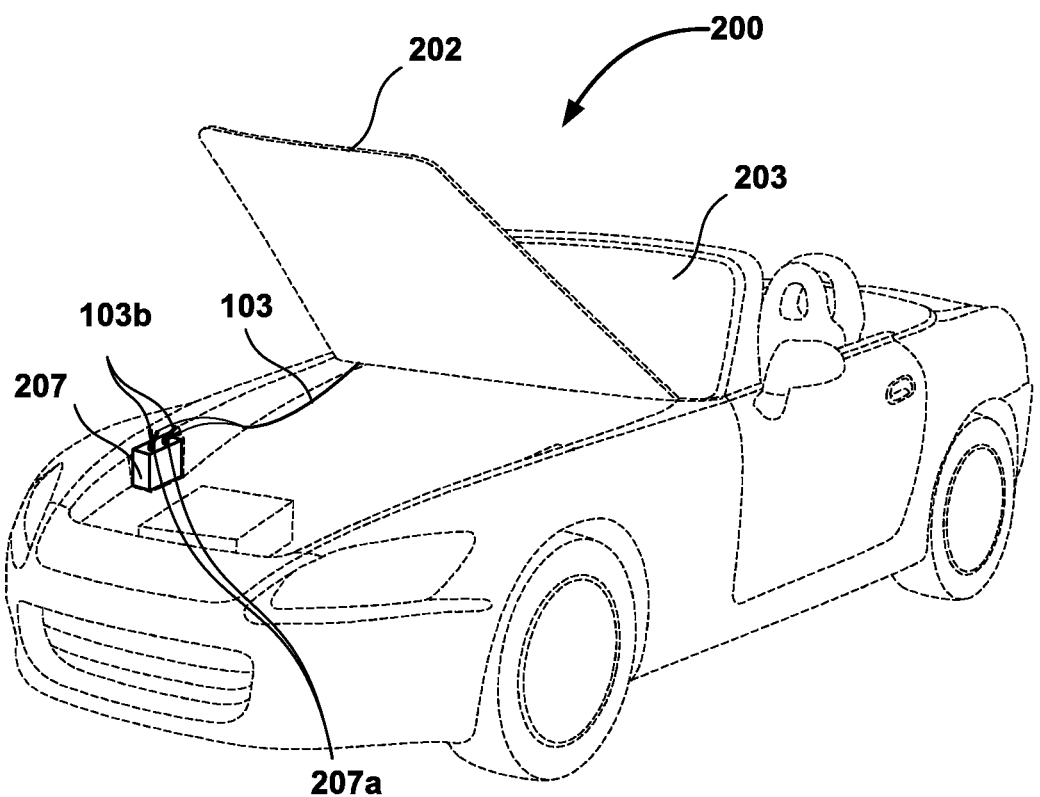
FIG. 4 shows the vehicle's hood in lifted position in order to pass the cable through the lip of the vehicle's hood to connect to positive and negative terminals of vehicle's battery housed within the vehicle's hood.

Turning back to FIG. 1, according to an embodiment, the night vision system 100 further includes the cable 103 used for connecting the night vision device 102 to a vehicle's battery 207. The cable 103 is used to transfer electrical power. Although in this embodiment, the cable 103 is usually used to connect the night vision device 102 to the vehicle's battery 207 (as shown in FIG. 4), it should be understood that the power for driving the night vision device 102 may be derived from vehicle's internal combustion engine, or other source of energy present in the vehicle. The cable 103 in this embodiment includes a connector 103a coupled at one end to connect to an input port 107 of the night vision device 102. The cable 103 further includes a pair of alligator clips 103b coupled at other end of the cable 103, each of the alligator clips 103b connect the night vision device 102 to a positive 207a and a negative terminal 207a of the vehicle's battery 207 as shown in FIG. 4. In an example, the pair of alligator clips 103b may be colour coded as black and red so that the user can connect the black alligator clip to the negative or ground connection on the vehicle's battery 207 and the red clip to the positive terminal of the vehicle's battery 207. It should be noted that device other than alligator clips 103b may also be used to connect the night vision device 102 to the vehicle's battery 207.

The night vision system 100 discussed above is easier to install on the chosen vehicle 200. The method of installation for the night vision system 100 described above (that includes the mount 101, the night vision device 102, the cable 103, and the display device 104) includes at least following steps:

The method starts with a step of locating an area around the lip 201 of the vehicle's hood 202 for mounting or securing or placement of the night vision device 102.

Following the step of locating the area on the vehicle's hood 202, a user can then place a mat (not shown) on the chosen area. The user herein refers to a user installing the night vision system 100 in general including a user driving the vehicle. The mat placed is preferably made of rubber or similar material so that the adhering surface of the vehicle 200 with the mount 101 doesn't get affected. Optionally, the user can also wet the surface around the lip 201 of the vehicle's hood 202 with a wet soapy sponge and rinse it off prior to placing the mat. In some other embodiment, the mat may be configured or fixedly attached at the bottom of the mount itself.

Following the step of placement of the mat, the user can then connect the mount 101 over the mat (using the shoe portion 101a of the mount 101) and ensure the mount 101 is properly laid over the mat. In an example, the user can use a hammer or other similar tools for properly aligning the mount 101 on the mat.

Next, once the mount 101 in mounted over the mat, the user can then mount the night vision device 102 over the mount 101 by slidably engaging a guide portion 106 of the night vision device 102 with a guide portion 101b of the mount 101 and screwing them together. Along with mounting or securing the night vision device 102 on the mount 101, the user can simultaneously align position of the night vision device 102 such that the night vision device 102 stands pointing straight ahead over a road.

Next, once the night vision device 102 is mounted over the mount 101 and screwed together, the user can screw the mount 101 and the night vision device 102 mounted thereon using the key with screw driver 105 that would lock the mount 101 in place ensuring the mount 101 or the night vision device 102 don't get displaced from their position or get removed during the vehicle ride.

Following the step of mounting of the night vision device 102 over the mount 101, the user can then connect the connector 103a end of the cable 103 to the input port 107 of the night vision device 102 and then guide the alligator clips 103b through underside of the lip 201 of the vehicle's hood 202 and connect to the positive and negative terminals 207a of the vehicle's battery 207 as shown in FIG. 4.

Next, upon connecting the cable 103 to the night vision device 102 and vehicle's battery 207, the night vision device 102 is automatically turned ON. According to the embodiment, the battery voltage is continuously monitored, and when the alternator brings the voltage above a threshold level then that voltage is taken up for switching on the night vision device 102 and when the voltage drops below a specified threshold for a given time, the night vision device 102 is turned off. After the device 102 is ON, the device 102 is able to detect thermal radiation from objects (falling within the vision of the device 102) using the IR detector 102b configured thereon. The vision of the IR detector will usually cover the road and alongside of the road. Further, upon detecting the thermal radiation from objects present within the device's 102 vision, the device 102 then apply the logics embedded therein to process and generate corresponding video stream. These video streams can be stored on in the memory unit 102e of the device 102 for later use or retrieval. The video stream generated by the device 102 is further transmitted to the user driving the vehicle 200 for display over the network such as for example WiFi.

Following the step detecting the object by the device 102, the user can then configure the display device 104 within interior of the vehicle 200 for displaying the video stream received from the night vision device 102. The user can opt for various methods for configuring the display device 104.

In one example implementation, the display device 104 can be removably fixed on the dashboard 204 of the vehicle 200 using some mountable bracket. In another example implementation as shown in FIG. 5, the user can make use of a non-slip mat 208 that can be fixedly placed on the dashboard 204 of the vehicle 200 and the display device 104 (such as a user's phone) can then be placed over the non-slip mat 208 to ensure the display device 104 don't slide away from the dashboard 204 during driving. However, the placement of the display device 104 on the vehicle's dashboard 204 over the non-slip mat 208 may not be enough for the user working on the steering to look at the displayed video steam running thereon. Thus, the user can configure the reflective display 206 on a windshield 203 of the vehicle 200 so that the video stream displayed on the display device 104 can be mirrored or casted on the reflective display 206. According to an example, the reflective display 206 is a reflective film having capability to adhere onto the windshield 203 of the vehicle 200. In some other embodiment, the user can configure the display device 104 onto the windshield 203 of the vehicle 200 using the suction mount 205 as shown in FIG. 6. Once configured, the detected objects (such as object "A") detected and transmitted by the night vision device 102 is then visible to the user driving the vehicle 200 in the form of thermal image over the display device 104. In the example, the detected object A is an animal. Upon looking at the streamed object on the display device 104, the user driving the vehicle 200 can make appropriate decisions to avoid any possible accidents during night or low light conditions. Although, it is described that the display device 104 may be mounted on the windshield 203, or the dashboard 204 of the vehicle 200. The scope of the claimed invention should not be construed to mounting of the display device 104 to only the windshield 203 and the dashboard 204. In some other example embodiments, the display device 104 may be mounted onto a pillar, a ceiling, or other visible locations within the interior of the vehicle 200 so that the user riding the vehicle 200 can see the streamed objected on the display of the display device 104.

Figure 8:
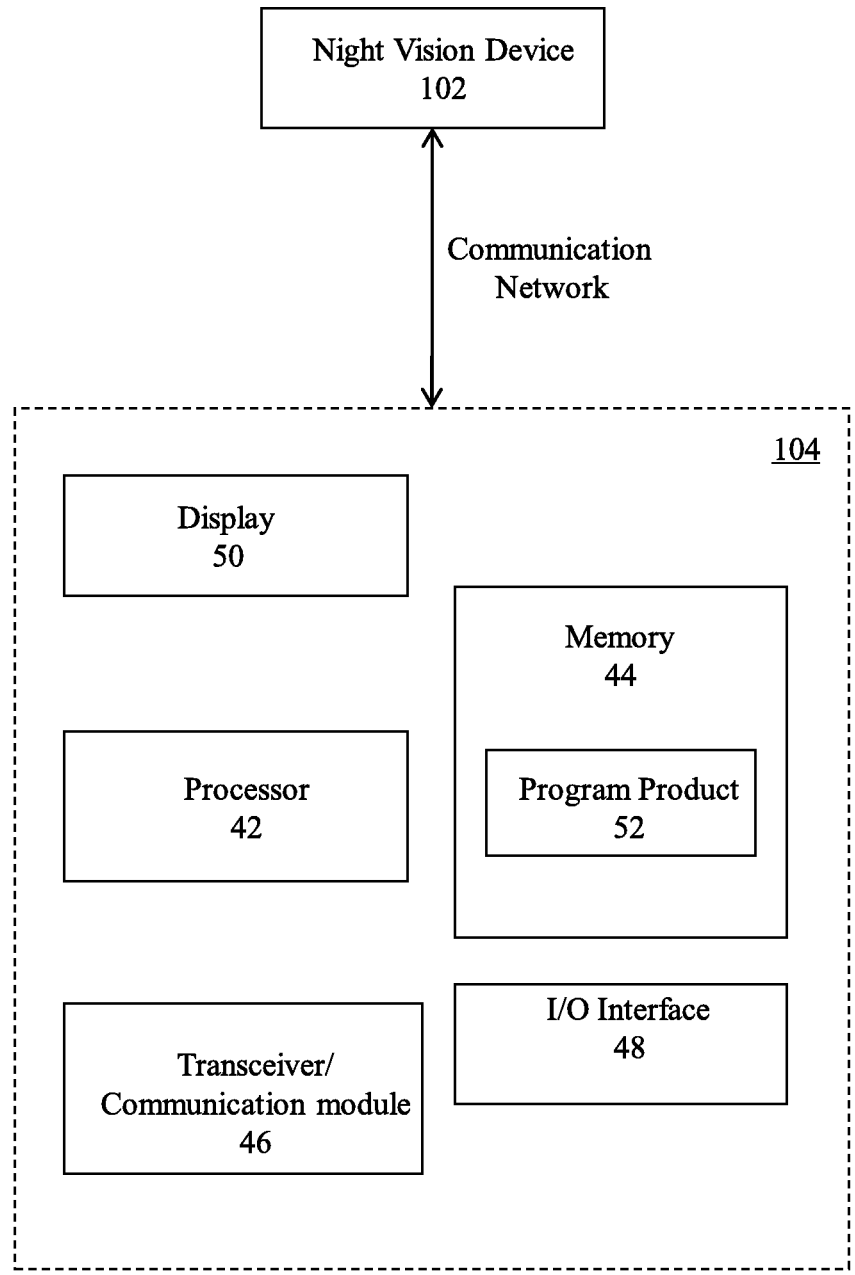
FIG. 8 illustrates a computing environment or general implementation for a display device such as a console phone used for displaying to the users the detected objects by the night vision device.

In accordance with an example implementation, as shown in FIG. 8, the display device 104 may include at least one or more processors, such as a processor 42, one or more memory, such as memory 44, a transceiver or communication module 46, one or more I/O interfaces, such as an I/O interface 48, a display 50, and a program product 52 stored in the memory 44.

The processor 42 may be communicatively coupled with the transceiver/communication module 46 to receive signals or video stream from the night vision device 102. Further, the transceiver 46 may be configured to transmit signals generated by the processor 42 to the display 50. The processor 42 is in communication with the memory 44, wherein the memory 44 includes the program product 52 described above that helps in receiving and displaying the video stream from the night vision device 102. The program product 52 is configured in the form of routines, programs, objects, components, data structures and the like, which perform particular tasks to be executed by the processor 42. The display device 104 may also be connected to other information processing devices by using the I/O interface 48. The display 50 of the display device 104 (such as mobile phone) may be utilized to receive inputs from the user using the display device 104. The I/O interfaces 48 may include a variety of software and hardware interfaces, for instance, interface for peripheral device(s) such as a keyboard, a mouse, a scanner, an external memory, a printer and the like. In an embodiment, the processor 42 may include different types of processors known in the art including neural network-based algorithms that are effectively used in several applications. In an aspect of the present invention, processor or the neural network may process large amount of data in real-time.

As mentioned above, the display device 104 may include but not limited to a smart phone, a tablet or other device that may communicate data via the network and may display information to the users (such as the user driving the vehicle 200) using a user interface (UI). Examples of types of the network include includes but are not limited to a wide area network, a radio network, a virtual private network, an internet area network, a metropolitan area network, a satellite network, Wi-Fi, a wireless network, and a telecommunication network.

Figure 9:
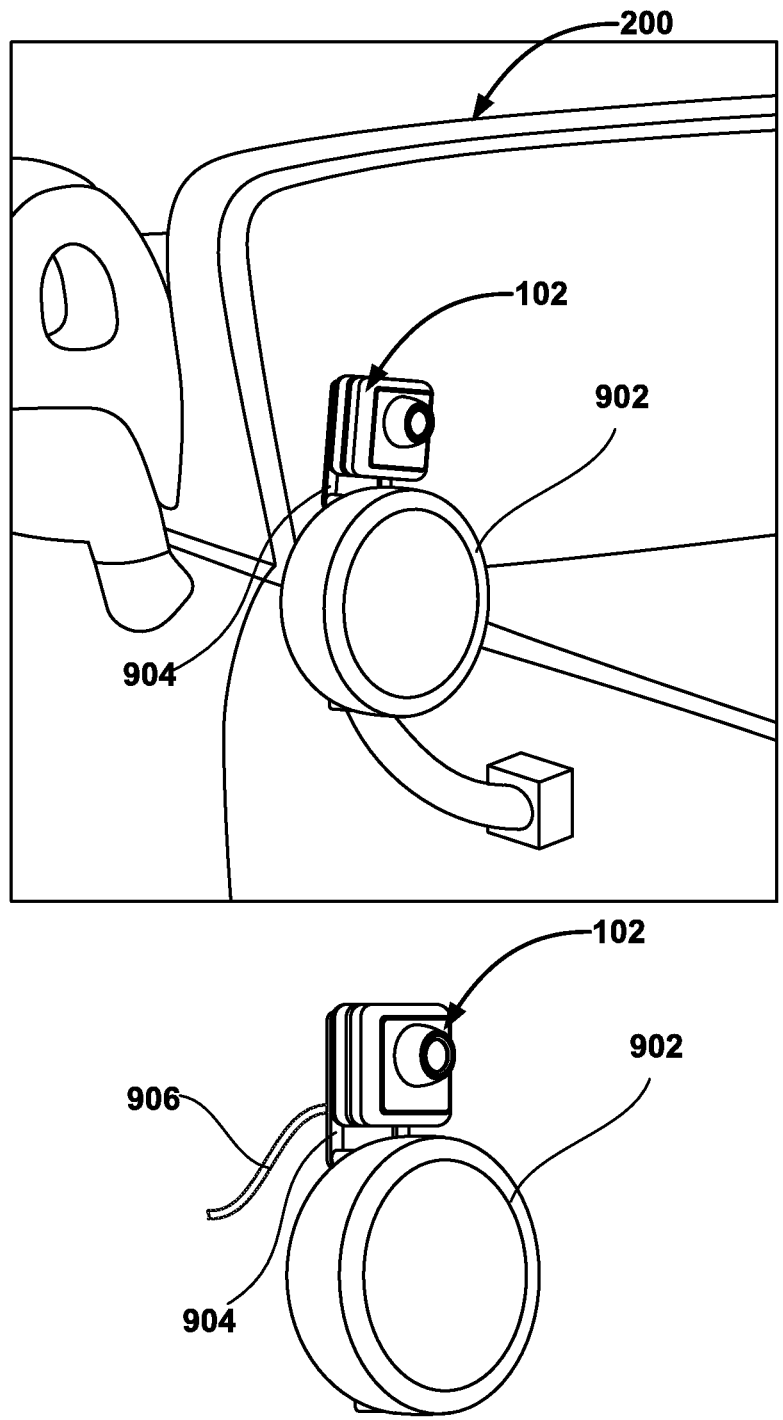
FIG. 9 shows an alternative embodiment for the night vision system with the night vision device mounted/configured over a spotlight of the vehicle.

Referring to FIG. 9, an alternative embodiment for the night vision system of the proposed invention with the night vision device mounted/configured over a spotlight of the vehicle is shown. Unlike the night vision device 102 discussed mounted over the hood 202 of the vehicle 200 in conjunction to FIGS. 1-6, in this embodiment, the night vision device 102 is mounted over the spotlight 902 of the vehicle 200. The night vision device 102 is mountable over the spotlight 902 using a mount 904. In an example, the mount 904 may be fixedly configured over the body of the spotlight 902 (during the manufacturing of the spotlights) and the device 102 can then simply be plugged or screwed on the mount 904. In another example, the mount 904 may be removably coupled over the body of the spotlight 902 and the device 102 can then simply be plugged or screwed on the mount 904. The device 102 is mounted over the mount 904 ensuring the device 102 gets a clear view of the objects located ahead on the road, or on either sides of the road. The internal configuration of the device 102, the display device 104 ideally remains the same as disclosed in FIGS. 7 and 8 respectively. In this embodiment also the device 102 will be connected to vehicle's power source such as vehicle's internal combustion engine, battery or other source of energy present in the vehicle 200 using a power cable 906 (in the form of detachable cable or direct wiring).

Figure 10:
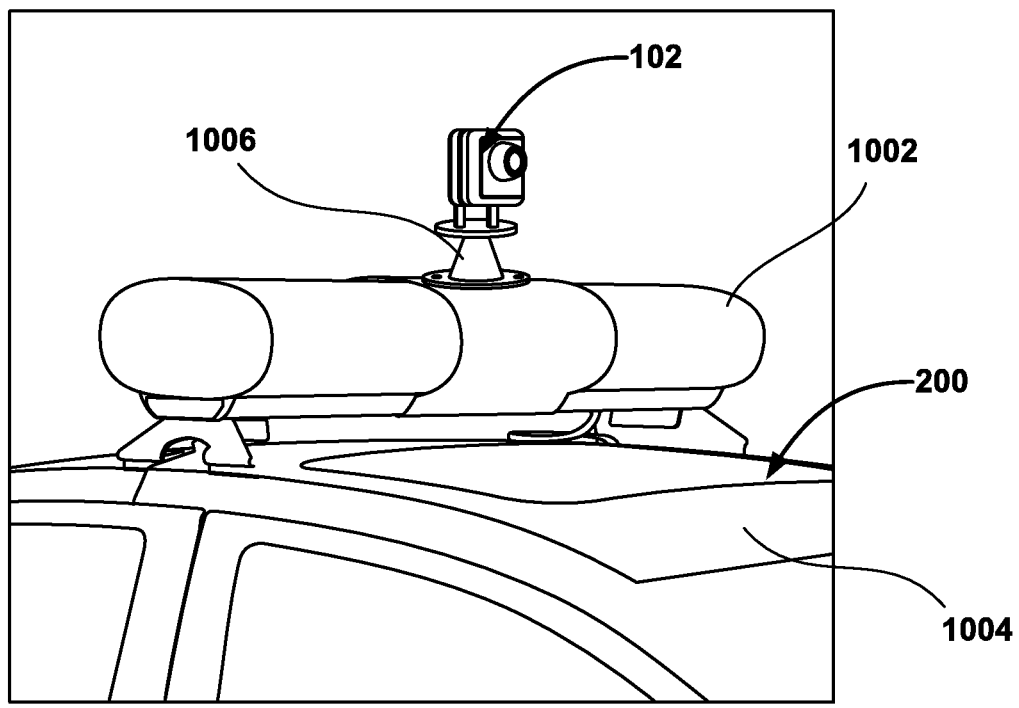
FIG. 10 shows another alternative embodiment for the night vision system with the night vision device mounted/configured over a light bar or roof of the vehicle.
Figure 10:
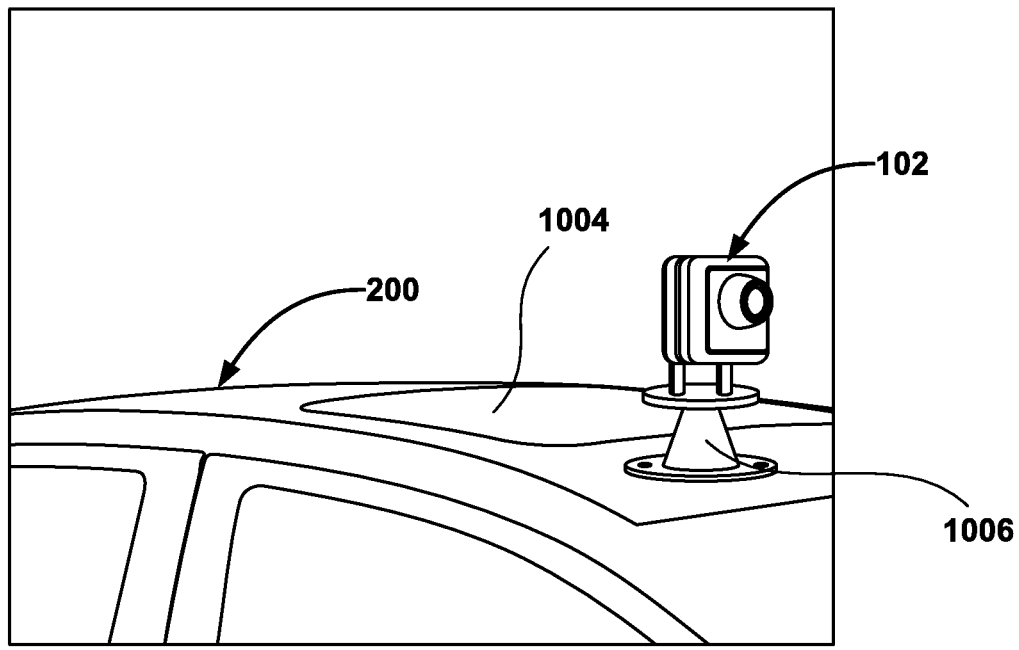

Referring to FIG. 10, another alternative embodiment for the night vision system of the proposed invention with the night vision device mounted/configured over a light bar or roof of the vehicle is shown. Unlike the night vision device 102 discussed mounted over the hood 202 of the vehicle 200 in conjunction to FIGS. 1-6, in this embodiment, the night vision device 102 is mountable over the light bar 1002 of the vehicle 200. The light bar 1002 generally mounted over the roof 1004 of the vehicle 200. The night vision device 102 is mountable over the light bar 1002 using a mount 1006. The mount may be configured as a single or dual piece. In a scenarios, where the mount 1006 is configured as a unitary product, the mount 1006 may be fixedly or removably configured over the body of the light bar 1002 (during the manufacturing of the light bar 1002) and the device 102 can then simply be plugged or screwed on the mount 1006. In a scenario where the mount 1006 is configured as a dual piece product, one piece of the mount 1006 may be removably coupled over the body of the light bar 1002 and the device 102 can then simply be plugged or screwed on the mount 1006 using the second piece of the mount 1006. In some embodiment, the device 102 may be mounted over front portion of the roof 1004 of the vehicle 200. The device 102 is mounted over the mount 1006 ensuring the device 102 gets a clear view of the objects located ahead on the road, or on either sides of the road when the vehicle 200 is driven. The internal configuration of the device 102, the display device 104 ideally remains the same as disclosed in FIGS. 7 and 8 respectively. In this embodiment also the device 102 will be connected to vehicle's power source such as vehicle's internal combustion engine, battery or other source of energy present in the vehicle 200 using a power cable (in the form of detachable cable or direct wiring).

Figure 11:
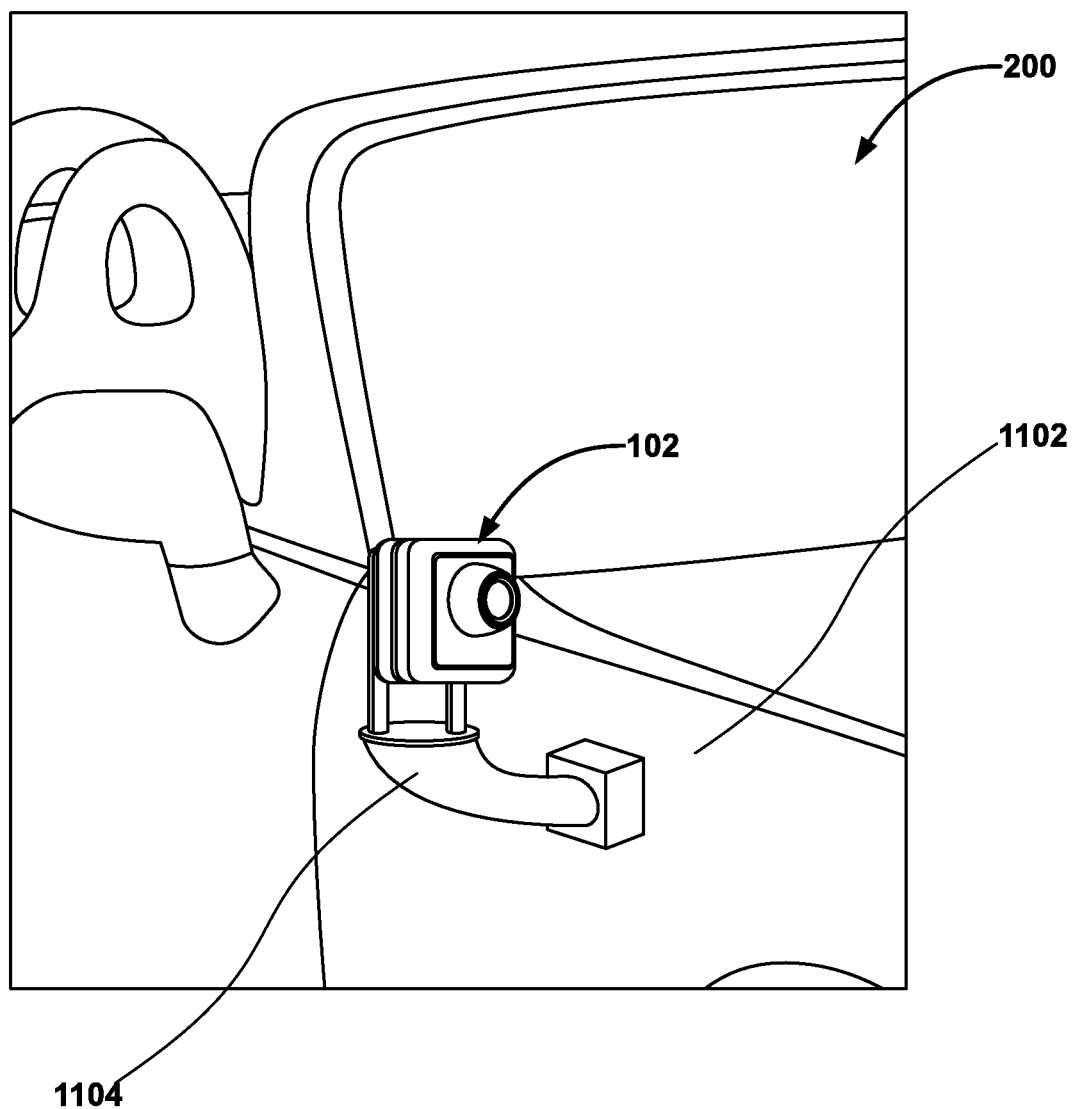
FIG. 11 shows yet another alternative embodiment for the night vision system with the night vision device mounted/configured over a fender of the vehicle.

Referring to FIG. 11, yet another alternative embodiment for the night vision system of the proposed invention with the night vision device mounted/configured over a fender region of the vehicle is shown. Unlike the night vision device 102 discussed mounted over the hood 202 of the vehicle 200 in conjunction to FIGS. 1-6, in this embodiment, the night vision device 102 is mountable over the fender 1102 of the vehicle 200. The night vision device 102 is mountable over the fender 1102 using a mount 1104. The mount 1104 may be configured as a single piece or dual pieces. In a scenario, where the mount 1004 is configured as a unitary product/single piece, the mount 1104 may be fixedly or removably configured over the fender 1102 and the device 102 can then simply be plugged or screwed on the mount 1104. In a scenario where the mount 1104 is configured as dual piece product, one piece of the mount 1104 may be removably coupled over the fender 1102 and the device 102 can then simply be plugged or screwed on the mount 1104 using the second piece of the mount 1104. The device 102 is mounted over the mount 1104 ensuring the device 102 gets a clear view of the objects located ahead on the road, or on either sides of the road when the vehicle 200 is driven. The internal configuration of the device 102, the display device 104 ideally remains the same as disclosed in FIGS. 7 and 8 respectively. In this embodiment also the device 102 will be connected to vehicle's power source such as vehicle's internal combustion engine, battery or other source of energy present in the vehicle 200 using a power cable (in the form of detachable cable or direct wiring).

Figure 12:
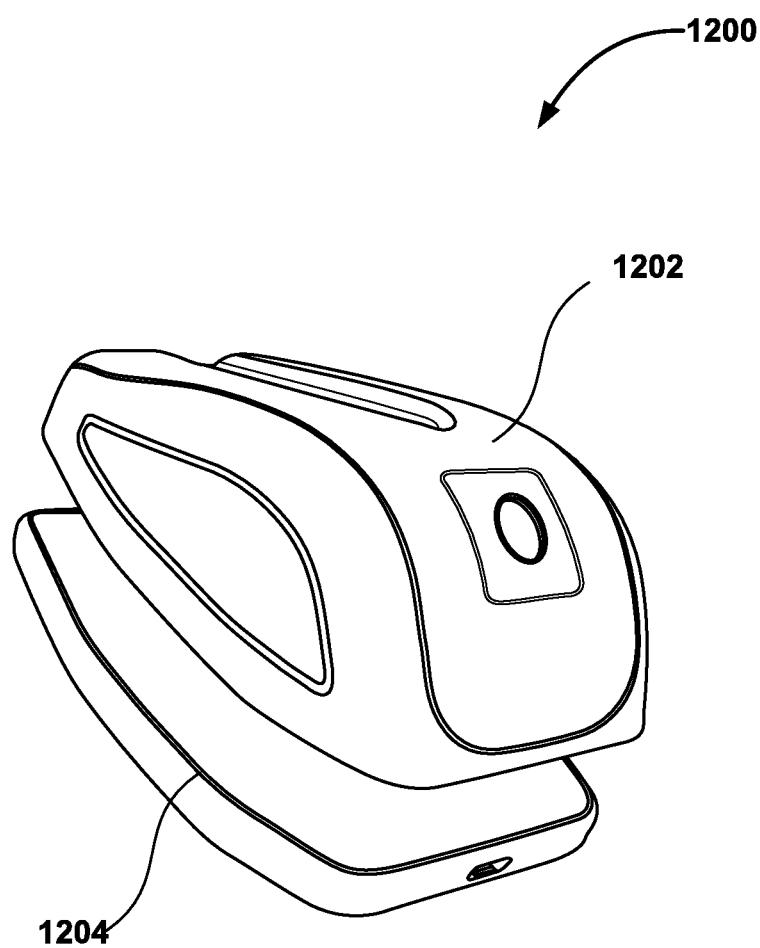
FIG. 12 shows another exemplary embodiment of the night vision system of the present invention.
Figure 13:
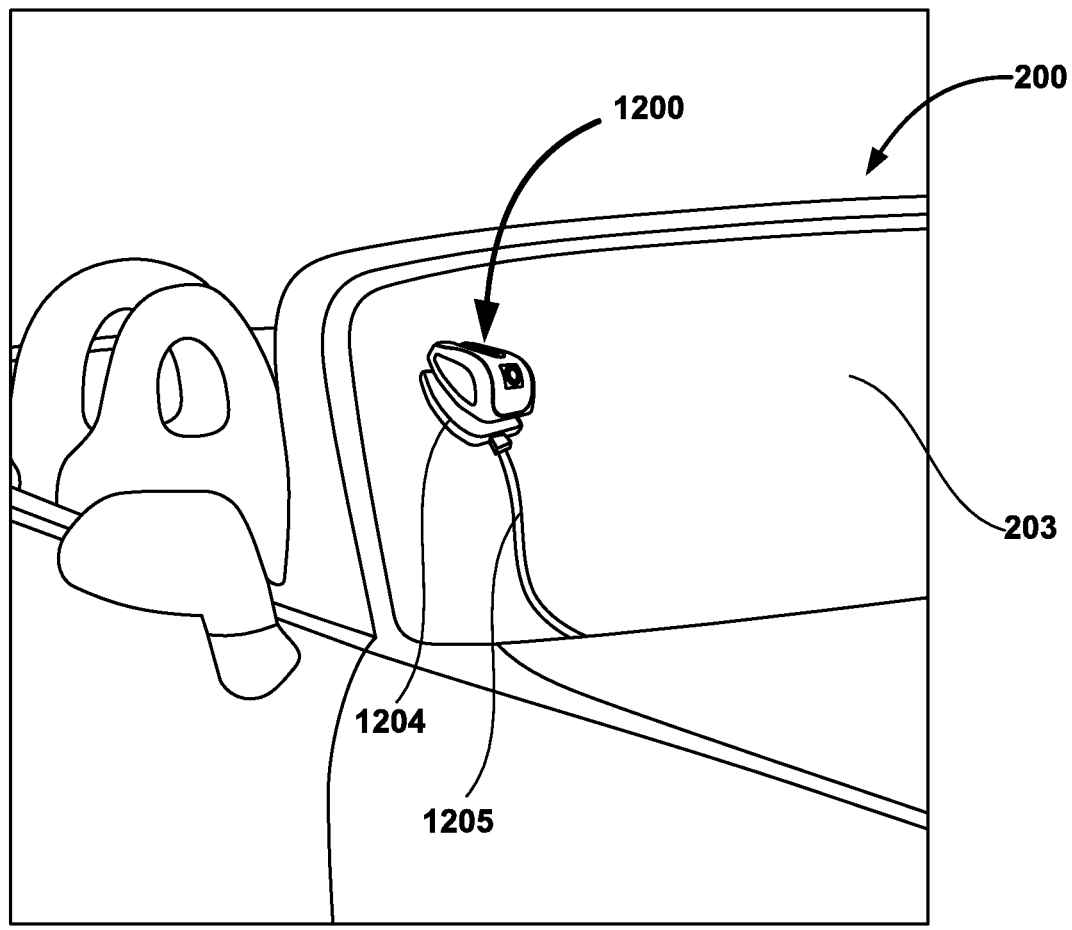
FIG. 13 shows the night vision system of FIG. 12 mounted over the windshield of the vehicle, in accordance with an exemplary embodiment.

Referring to FIGS. 12 and 13, another embodiment of the present invention is shown. As described above with respect to FIGS. 1-6, the night vision device 1200 would be powered using the cable 1205 through the vehicle's battery 107, however it should not be construed as a limitation. In some other embodiments, the device 1200 may be powered using internal combustion engine, or other source of energy present in the vehicle. As shown in the embodiment represented in FIGS. 12 and 13, the night vision device 1200 may utilize wireless charging, further reducing requirements for the cable 1205 and plugging into a power source (such as the vehicle's battery 107). In the wireless version of the device 1200, the night vision device 1200 is mounted on the windshield 203 of the vehicle 200 as shown in FIG. 13. The camera portion 1202 is configured just opposite to a pad 1204 mounted on the inner side of the windshield. In the example, the camera 1202 may be wirelessly powered using inductive coupling. The pad 1204 mounted inside the windshield 203 of the vehicle 200 would act as a power transmitter and another pad (not seen) present inside the camera unit 1202 having inductor would act as a power receiver to enable wireless charging for the camera 1202 of the night vision device 1200. In some other embodiment, the other pad 1204 may be a separate pad that may be configured on the vehicle's windshield 203 outside over which the camera unit 1202 may be mounted. In operation, the night vision device 1200 may be wirelessly and inductively powered as well as transmit data using such set up. In some other embodiment, pad 1204 may be configured such that the two pads (the pad 1204 and the pad present inside the camera unit 1202 may include data transmission capability.

Although particular embodiments of the invention have been described in detail for purposes of illustration, various modifications and enhancements may be made without departing from the spirit and scope of the invention.

What is claimed is:

1. A modular night vision system for a vehicle, the system comprising:
   a mount configured to be secured on a hood of the vehicle, wherein the mount includes a shoe portion to clip or hook onto a lip of the hood and a guide portion extending upward from the hood; and
   a thermal radiation night vision device having a guide extending downward from a body thereof, wherein the thermal radiation night vision device is detachably secured to the mount by slidably engaging the guide of the thermal radiation night vision device with the guide of the mount and then screwing the guides together, wherein the thermal radiation night vision device is mounted pointing over a road for detecting thermal radiation from one or more objects present on and alongside the road, and wherein the thermal radiation night vision device creates a video stream from the detected thermal radiation from the one or more objects and transmits the video stream to a display device located within an interior of the vehicle for viewing by a driver of the vehicle.

2. The night vision system of claim 1, wherein the thermal radiation night vision device comprises:
   a far wave infrared thermal detector for detecting thermal radiation from the one or more objects;
   a processor in communication with the far wave infrared thermal detector for receiving the detected thermal radiation from the one or more objects, processing the detected thermal radiation, and generating the video stream corresponding to the detected thermal radiation;

a power supply and logic board in communication with the processor for controlling and managing the operations of the processor; and a communication module linked to the processor for wirelessly transmitting the generated video stream to the display device.

3. The night vision system of claim 2, wherein the far wave infrared thermal detector is a Micro-bolometer.

4. The night vision system of claim 2, wherein the thermal radiation night vision device further comprises a memory unit configured to store the generated video stream for later retrieval.

5. The night vision system of claim 1, wherein the display device is selected from a mobile phone, a computer, a laptop or a tablet.

6. The night vision system of claim 1, wherein the display device is detachably mountable to a windshield, or a dashboard of the vehicle.

7. The night vision system of claim 1, wherein the display device is detachably mountable to a dashboard of the vehicle, and wherein the video stream presented on the display device is mirrored on a reflective display mounted on a windshield.

8. The night vision system of claim 1, further comprising an electrical cable connecting the thermal radiation night vision device to a source of power present in the vehicle.

9. The night vision system of claim 8, wherein the source of power is selected from a vehicle's internal combustion engine, or a battery.

10. A method for providing a modular night vision system on a vehicle, the night vision system comprising a mount, and a thermal radiation night vision device for detecting thermal radiation from one or more objects and creating a video stream from the detected thermal radiation, the method comprising:

securing the mount on a hood of the vehicle, wherein the mount includes a shoe portion to clip or hook onto a lip of the hood and a guide portion extending upward from the hood;

securing the thermal radiation night vision device to the mount, wherein the thermal radiation night vision device includes a guide extending downward from a body thereof, wherein the thermal radiation night vision device is secured to the mount by slidably engaging the guide of the thermal radiation night vision device with the guide of the mount and then screwing the guides together, wherein the night vision device is mounted and positioned such that the night vision device points over a road for detecting the thermal radiation of the one or more objects present on and alongside the road;

electrically connecting the night vision device to a source of power of the vehicle; and transmitting the video stream from the thermal radiation night vision device to a display device mounted within an interior of the vehicle so the video stream is presented such that a driver can view while driving.

11. The method of claim 10, wherein the thermal radiation night vision comprises:

a far wave infrared thermal detector for detecting thermal radiation from the one or more objects;

a processor in communication with the far wave infrared thermal detector for receiving the detected thermal radiation from the one or more objects, processing the detected thermal radiation, and generating the video stream corresponding to the detected thermal radiation;

a power supply and logic board in communication with the processor for controlling and managing the operations of the processor; and a communication module linked to the processor for wirelessly transmitting the generated video stream to the display device.

12. The method of claim 10, wherein the display device is selected from a mobile phone, a computer, a laptop, or a tablet.

13. The method of claim 10, wherein the display device is mountable to a windshield, or a dashboard of the vehicle.

14. The method of claim 10, wherein the display device is detachably mountable to a dashboard of the vehicle, and wherein the video stream presented on the display device is mirrored on a reflective display mounted on a windshield.

15. The method of claim 10, wherein the electrically connecting the night vision device to the source of power of the vehicle is facilitated by an electrical cable.

16. The method of claim 11, wherein the far wave infrared thermal detector is a Micro-bolometer.

17. A modular night vision system for a vehicle, comprising:

a mount configurable on a lip of a vehicle's hood;

a thermal radiation night vision device for detecting thermal radiation from one or more objects, the night vision device being mountable on the hood of the vehicle by securing to the mount, wherein the night vision device is mounted pointing over a road for detecting the thermal radiation of the one or more objects present on and alongside the road, and wherein the thermal radiation night vision device creates a video stream from the detected thermal radiation from the one or more objects and transmits the video stream to a display device located within an interior of the vehicle for viewing by a driver of the vehicle; and an electrical cable for electrically connecting the night vision device to a source of power of the vehicle.

18. The night vision system of claim 17, wherein the mount comprises a shoe portion that hooks onto the lip of the vehicle's hood, a guide portion configured to connect to a complementing guide portion of the thermal radiation night vision device, and a provision to drive in a screw therein in order to lock the mount in place and to ensure that the thermal radiation night vision device doesn't get removed easily when the thermal radiation night vision device is securely mounted over the mount.

19. The night vision system of claim 17, wherein the display device is mountable to a windshield, or a dashboard of the vehicle.

* * * * *